US008599905B2

(12) United States Patent
Lachover et al.

(10) Patent No.: US 8,599,905 B2
(45) Date of Patent: Dec. 3, 2013

(54) PROCESSOR FOR USE AS A PATH SEARCHER OF A SPREAD SPECTRUM RECEIVER AND A METHOD OF OPERATION OF THE PROCESSOR

(75) Inventors: Dmitry Lachover, Holon (IL); Amir Chass, Ramat-Hasharon (IL); Gideon Kutz, Ramat-Hasharon (IL)

(73) Assignee: Freescale Semiconductor, Inc., Austin, TX (US)

( * ) Notice: Subject to any disclaimer, the term of this patent is extended or adjusted under 35 U.S.C. 154(b) by 413 days.

(21) Appl. No.: 12/867,496

(22) PCT Filed: Feb. 22, 2008

(86) PCT No.: PCT/IB2008/050658
§ 371 (c)(1),
(2), (4) Date: Aug. 13, 2010

(87) PCT Pub. No.: WO2009/104057
PCT Pub. Date: Aug. 27, 2009

(65) Prior Publication Data
US 2010/0329313 A1    Dec. 30, 2010

(51) Int. Cl.
*H04B 1/69*      (2011.01)
(52) U.S. Cl.
USPC ............ 375/150; 375/148; 375/149; 375/152
(58) Field of Classification Search
USPC ......................................... 375/150, 148, 149
See application file for complete search history.

(56) References Cited

U.S. PATENT DOCUMENTS

| | | | | |
|---|---|---|---|---|
| 5,500,872 A | * | 3/1996 | Kinney et al. | 375/150 |
| 7,764,726 B2 | * | 7/2010 | Simic et al. | 375/150 |
| 2002/0064215 A1 | * | 5/2002 | Yasaki | 375/150 |
| 2004/0229637 A1 | * | 11/2004 | Wang et al. | 455/506 |

FOREIGN PATENT DOCUMENTS

| | | |
|---|---|---|
| GB | 2385477 A | 8/2003 |
| WO | 2007/001288 A | 1/2007 |
| WO | 2007/025749 A | 3/2007 |

OTHER PUBLICATIONS

Fukumoto S et al: "Matched Filter-Based Rake Combiner for Wideband DS-CDMA Mobile Radio" IEICE Transactions on Communications, Communications Society, Tokyo, JP, vol. E81-B, No. 7, Jul. 1, 1998.
Elders-Boll Harald: "Simplified Interference-based Threshold Rule for Delay Selection in DS-CDMA Systems" Personal, Indoor and Mobile Radio Communications, 2000, 11th IEEE International Symposium, London, UK, vol. 1, pp. 77-81, 2000.
International Search Report and Written Opinion correlating to PCT/IB2008/050658 dated Dec. 10, 2008.

* cited by examiner

Primary Examiner — Qutbuddin Ghulamali

(57) ABSTRACT

A path searcher for use in a spread spectrum receiver, including a correlator for correlating a received signal in different time positions with a reference code to select for further processing time positions of the signals showing the strongest correlations, wherein the correlator is operable to obtain a correlation energy result for each time position in a set of possible time positions, a comparator for comparing the correlation energy results with each of a plurality of energy thresholds and a recorder for recording data indicating time positions for correlation energy results which are not less than the respective thresholds in different groups corresponding to the respective thresholds. Also described is a semiconductor device and a receiver incorporating the path searcher and a method of operation of the path searcher.

20 Claims, 5 Drawing Sheets

PROCESSOR FOR USE AS A PATH SEARCHER OF A SPREAD SPECTRUM RECEIVER AND A METHOD OF OPERATION OF THE PROCESSOR

FIELD OF THE INVENTION

The present invention relates to a processor for use as a path searcher of a spread spectrum receiver and a method of operation of the processor. In particular, the processor may provide a stage of a multi-stage path searcher of a channel profile acquisition stage in a WCDMA receiver.

BACKGROUND OF THE INVENTION

Third Generation mobile communication systems are modern systems designed for multimedia communications. Using such systems, person-to-person communications can be established which include high quality picture and video images. Access to information and services on public and private networks in enhanced form can also be achieved by the higher data rates and improved data handling capabilities available using such systems.

WCDMA (Wideband Code Division Multiple Access) technology has emerged as the most widely adopted air interface technology for Third Generation mobile technology. Such technology is based upon protocols defined in a number of industry standards. A number of the important international standards have been defined as 3GPP (3rd Generation Partnership Project) standards by ETSI (the European Telecommunications Standards Institute).

In a WCDMA system, all users employ the same carrier frequency in a given channel and all can transmit or receive simultaneously. In order to be able to distinguish between different users, each transmitting user in each channel uses a code sequence which is unique, the 'scrambling code'. Each channel carrier has a large bandwidth (e.g. 5 MHz), and transmitted user information bits (symbols) for radio communication are spread over a wide frequency bandwidth of the channel by multiplying the user data bits with a spreading code comprising a sequence of 'chips' or rectangular pulses having a regular chip length.

In a receiver for use in a WCDMA system, the Channel Profile Acquisition (CPA) stage is a very important stage for decoding a received signal. Such a stage includes a processor known as a path searcher. The purpose of this processor is as follows. In wireless communication, signals may travel along many different propagation paths before reaching a receiver. Since each path has a different length and the signals travel at the same speed, there is multiplicity of arrival times at the receiver for the signals from the various paths. The signals at the different arrival times are replicas of one another differing only in amplitude and phase. The path searcher finds the signals from different paths received at different arrival times.

As defined by 3GPP, the path searcher in one known form may be based on the Primary Common Pilot Channel (P-CPICH) standard in which the transmitted signal may be considered as a P-CPICH signal. According to the P-CPICH standard, each communication frame has a duration of 10 msec in a common timing protocol of the communication system, and each frame contains 15 slots. In each slot, ten complex symbols of 1+j are transmitted. Each symbol is expanded into chip level by a fixed spreading factor of 256 with a spreading code of "all ones." P-CPICH signals carry data (user communicated data), spreading code, and scrambling code. However, data is in the form of the complex symbol 1+j and the spreading code consists of 256 ones, so the only valuable information extracted from P-CPICH signals is therefore the scrambling code. The path searcher performs a scrambling code correlation with a received signal at each time position of a given set of possible positions to select the positions giving the strongest correlation results in terms of correlation energy.

In order to reduce processing complexity of a processor serving as a path searcher, a procedure known as a double dwell search may be employed. Such a procedure operates as follows. In a first dwell or first stage of processing in the procedure, a short duration correlation (with a given scrambling sequence) is carried out in each of a complete set of possible signal time positions for a given channel. A sub-set of the time positions showing the strongest correlations is selected for further processing in a second dwell or second stage of processing in the procedure. In the second dwell, a longer duration correlation is carried out for each of the time positions selected by the first dwell to select an even smaller sub-set of the time positions for further processing.

SUMMARY OF THE INVENTION

In accordance with aspects of the invention, there is provided a processor for use in a path searcher of a spread spectrum receiver, a semiconductor device incorporating the processor, a receiver including the processor and a method of operation of the processor as defined in the appended claims.

Specific embodiments of the invention are set forth in the dependent claims. These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings.

DESCRIPTION OF EMBODIMENTS

Examples of embodiments of the invention will be described in terms of a system-on-chip (SoC) comprising part of a WCDMA receiver including a path searcher of the receiver. Although the examples will be described in terms of a system-on-chip (SoC) comprising part of a WCDMA receiver including a path searcher, it will be appreciated that the inventive concept herein described may be embodied in any apparatus or device that incorporates part of the WCDMA receiver including the path searcher.

Figure 1:
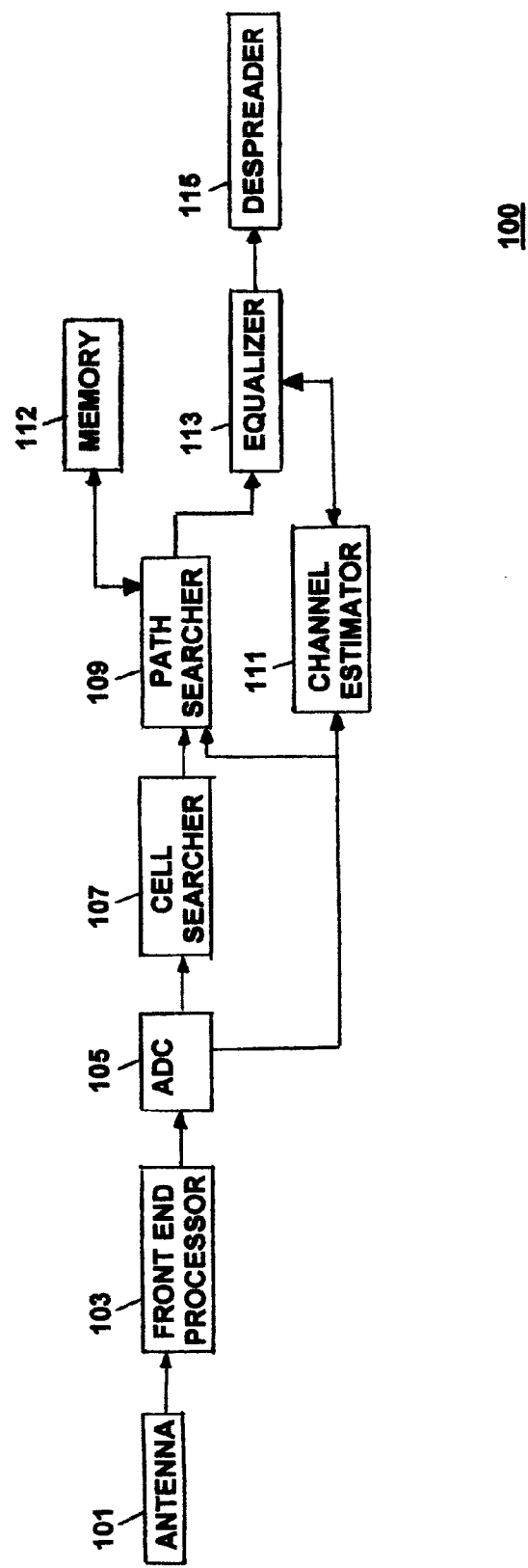
FIG. 1 is a block schematic diagram of part of an illustrative WCDMA receiver embodying the present invention.

Referring to FIG. 1, there is illustrated an architecture for part of a WCDMA receiver 100. The receiver 100 is illustratively an equalizer based receiver, although for a different implementation it could be in the form of a rake receiver instead. The receiver 100 may include an antenna 101, a front end processor 103, an ADC (Analog to Digital Converter) 105, a cell searcher 107, a path searcher 109, a channel estimator 111, a memory 112, and equalizer 113 and a despreader 115. An incoming received RF signal is received by the antenna 101. The signal is processed in analog RF form by the front end processor 103 which may include for example one or more low noise amplifiers, one or more AGC (Automatic Gain Control) processors and a frequency downconverter which converts the signal to a baseband form. The signal is converted to digital form by the ADC (Analog to Digital Converter) 105. The ADC 105 produces an output signal which comprises the received signal in baseband digital form. The output signal from the ADC 105 is delivered to each of several components of a demodulator line-up which may comprise the cell searcher 107, the path searcher 109, the channel estimator 111, the equalizer 113 and the despreader 115.

The cell searcher 107, the path searcher 109, the channel estimator 111, the equalizer 113 and the despreader 115 all perform known demodulation functions.

The cell searcher 107 finds information relating to the identity and synchronisation of the system base station cell which forwarded the received signal. In particular, the cell searcher 107 finds a scrambling code associated with the received signal and provides the code as an input to the path searcher 109.

The path searcher 109: (i) searches through the arrival positions in time of the replica signals from each of the different possible propagation paths which together constitute the wanted signal; and (ii) selects the positions in time which give the strongest correlation results in terms of correlation energy. The path searcher 109 may be as described in more detail later with reference to FIGS. 2 to 4 and FIG. 6.

The channel estimator 111 performs very long correlations (up to 7680 chips in duration) for the replica signals at each of the time positions selected by the path searcher 109 to estimate the amplitude and phase of the signals at those selected time positions. The selected time positions of the replica signals are thus equivalent to channel taps or fingers.

The equalizer 113 is a filter that reconstructs signals destroyed by the communication channel. The equalizer 113 calculates weights and positions of coefficients based on the time positions selected by the path searcher 109 and whose amplitude and phase have been found by the channel estimator 111. The equalizer 113 has a response which converges approximately to the inverse of the channel impulse response.

The despreader 115 performs correlation of the reconstructed, spread signal (at the chip rate) with the CDMA spreading code to convert the signal from its chip rate to its symbol rate to extract the symbols communicated as user information in the received signal.

The memory 112 stores programs and data needed in operation by the modulation and decoding components shown in FIG. 1, especially the path searcher 109. The memory 112 may store the scrambling code found by the cell searcher 107 and provided to the path searcher 109 for use by the path searcher 109.

The path searcher 109, optionally together with any one or more of the components of the receiver 100 shown in FIG. 1, may comprise a system-on-chip (SoC) or other implementation in which the components are incorporated in a semiconductor device (integrated circuit chip).

The path searcher 109 will now be described in more detail. The path searcher 109 may illustratively be based on the Primary Common Pilot Channel (P-CPICH) standard referred to earlier. For each time position of a set of time positions corresponding to different signal propagation paths, the path searcher 109 carries out a correlation with a received signal at the position to find the time positions giving the strongest correlations. It is to be noted that the received signal at each time position may consist of a combination of many codes of different data channels, which may include the wanted P-CPICH channel, as well as noise. The unknown signal at each time position is correlated with the wanted scrambling code. The wanted scrambling code is the scrambling code of the wanted cell having the reference scrambling code found at the cell search stage by the cell searcher 107. The wanted scrambling code is only one of many possible codes that may have combined to give the total received signal at each time position. So the purpose of each correlation is to filter out or weaken unwanted codes to isolate and strengthen the wanted code. This allows time positions that include replicas of the wanted signal to be found, based on the knowledge that these replicas include the wanted scrambling code.

Figure 2:
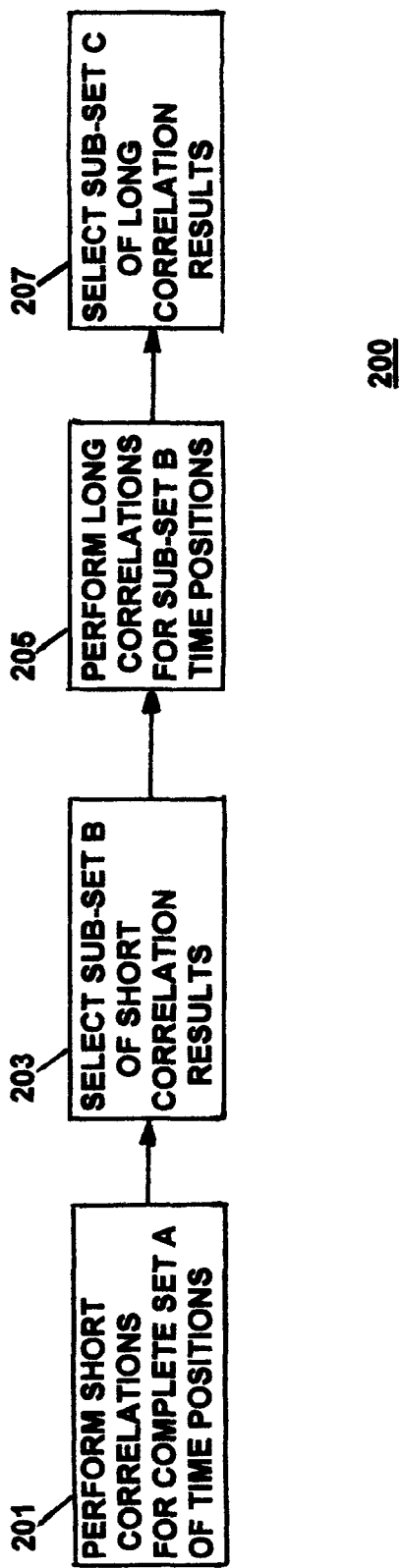
FIG. 2 is a flow chart of a method of operation in a path searcher of the receiver of FIG. 1.

The path searcher 109 performs a path searching procedure 200 which (in its most general form) is known per se and is illustrated in FIG. 2. The path searcher 109 performs the procedure 200 repeatedly for each processing frame of the received signal, that is each cycle of operation of the path searcher 109. The duration of the path searching procedure 200 (in terms of a system clock controlling timing within the receiver 100) is dependent on the hardware implementation employed, so the duration and frequency of the procedure 200 can be selected to suit the practical hardware implementation of the receiver 100. For example, the path searching procedure 200 can be performed for each consecutive WCDMA frame, where the length of the WCDMA frame is 10 msec. Alternatively, the path searching procedure 200 can be performed for example for each consecutive WCDMA slot, wherein there are 15 slots in one WCDMA frame.

The path searching procedure 200 carried out in each processing frame may be a double dwell procedure which includes steps 201 and 203 relating to a first dwell and steps 205 and 207 relating to a second dwell of the double dwell procedure.

In the step 201, the path searcher 109 performs a short duration correlation operation with the signals received at each of a complete set A of different possible time positions in a given channel.

The set A may for example comprise m equally spaced time positions, where m is a large number which is an integral power of two, e.g. 512 ($2^9$). Each correlation is carried out at each of the time positions using a code stored in the memory 112. The code used for the correlations may be the scrambling code for a P-CPICH signal referred to earlier as found by the cell searcher 107. The correlations in step 201 may be carried out as serial or as parallel operations or some of the operations may be carried out serially on parallel blocks of the components. The correlations in step 201 are of short duration. Each correlation may last for example for a time equivalent to 256 ($2^8$) or 512 ($2^9$) chips. The number of results obtained in step 201 equals the number of time positions in set A, i.e. one result is obtained for each time position. The best results obtained in step 201 are those obtained from wanted replica signals which provide the strongest correlations as shown by the greatest correlation energies as obtained (by squaring) from the respective correlation amplitudes.

In the step 203, a sub-set B of the results (also known as 'taps') of the short correlations carried out in step 201 is selected. The sub-set B consists of a maximum number n of the best results obtained in step 201, where n is a number smaller than m which is an integral power of two, e.g. n is 64 ($2^6$). An example of a procedure which may be used to carry out step 203 is as described later with reference to FIGS. 3 and 4.

In the step 205, the replica signals at the selected time positions giving the sub-set B of the best correlation results in step 203 are further processed. Each of the replica signals is subject to a further correlation with the same code used for the short duration correlations in step 201. The correlations in step 205 may be carried out as serial or as parallel operations or some of the operations may be carried out serially on parallel blocks of the components. The correlations in step 205 are of longer duration than those of step 201. Each correlation in step 205 may last for example for a time equivalent to 2048 ($2^{11}$) or 4096 ($2^{12}$) chips. The longer duration correlations allow more accurate correlation energy results to be obtained compared with the coarser short duration correlations of step 201. The best results obtained in step 205 are again those results obtained from replica signals which provide the greatest correlation energies as obtained from the correlation amplitudes.

In the step 207, a sub-set C of the time positions of replica signals is selected from the results of the correlations carried out in step 205. The sub-set C is a sub-sub-set of the sub-set B. The sub-set C may consist of a maximum of p results obtained in step 205, where p is a number smaller than n which is an integral power of two, e.g. p is 16 ($2^4$) or 32 ($2^5$).

The sub-set C of results is delivered for further processing to the channel estimator 111 via the equalizer 113 and further processed in a known manner.

Figure 3:
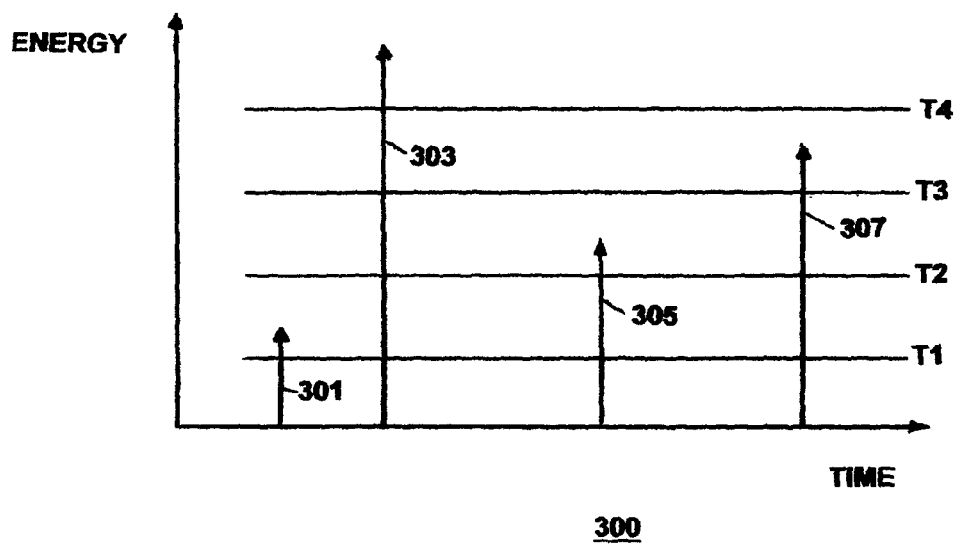
FIG. 3 is a schematic graph of correlation energy versus time illustrating operation of a path searcher of the receiver of FIG. 1 operating in accordance with an embodiment of the present invention.

FIG. 3 is a graph 300 of correlation energy versus time illustrating how step 203 may be carried out by an example of a procedure. Four illustrative correlation results 301, 303, 305 and 307 are shown for four different time positions within the set A of m time positions referred to above. Each result is shown as a vertical line whose upper end represents the correlation energy result. The correlation energy is given by the square of the correlation amplitude. Each result is compared with each of a plurality of threshold correlation energy values, namely a threshold T1, a threshold T2 which is at a greater energy level than the threshold T1, a threshold T3 which is at a greater energy level than the threshold T2 and a threshold T4 which is at a greater energy level than the threshold T3. The result 301 is seen to be greater than the threshold T1 but less than the thresholds T2, T3 and T4. The result 303 is seen to be greater than all of the thresholds T1, T2, T3 and T4. The result 305 is seen to be greater than the thresholds T1 and T2 but less than the thresholds T3 and T4. The result 307 is seen to be greater than the thresholds T1, T2 and T3 but less than the threshold T4.

Data entries for the time positions giving correlation energy results which are not less than the four respective thresholds T1, T2, T3 and T4 are recorded in four different groups. Each data entry may identify the time position of the replica signal giving a particular result as well as the correlation energy result. A first group G1 consists of data entries for the correlation energy results which are not less than the threshold T1 but less than the other thresholds. A second group G2 consists of data entries for the correlation energy results which are not less than the threshold T2 but less than the thresholds T3 and T4. A third group G3 consists of data entries for the correlation energy results which are not less than the threshold T3 but less than the threshold T4. A fourth group G4 consists of data entries for the correlation energy results which are not less than the threshold T4.

The different groups G1, G2, G3 and G4 referred to above may be compiled in one or more tables or lists. Where tables are employed, they may for example include: (i) a first table in which are recorded (entered) the data entries for the first group G1; (ii) a second table in which are recorded the data entries for second group G2; (iii) a third table in which are recorded the data entries for the third group G3; and (iv) a fourth table in which are recorded the data entries for the fourth group G4. Thus, the number of tables in which data is recorded may be equal to the number of thresholds used as well as the number of groups of data entries which correspond to those different thresholds.

Thus, using the four tables described above, data for the replica signal showing the result 301 is recorded in the data entries for that group G1 in the first table; data for the replica signal showing the result 303 is recorded in that for the group G4 in the fourth table; data for the replica signal showing the result 305 is recorded in that for the group G2 in the second table; and data for the signal showing the result 307 is recorded in that for the group G3 in the third table.

Where there are four tables to accommodate the four groups G1, G2, G3 and G4 of data entries as described above, each of the tables may have a maximum of n/4 data entry positions to fill. Alternatively, one or more of the tables may have a maximum of more or less than n/4 positions to fill. In any event, the tables have a maximum of n positions in total to fill.

The selection of results for further processing in step 205 is made for each processing frame using the four tables by taking the data entries from the different tables, beginning with the entries for the group G4 in the fourth table, then the entries for the group G3 in the third table, then the entries for the group G2 in second table, then the entries for the group G1 in the first table.

The example of a method for use in step 203 of the procedure 200 illustrated in FIG. 2 may be operated using a minimum of two thresholds, thereby forming a minimum of two groups, although any number of thresholds greater than two, e.g. four as illustrated in FIG. 3, may be used instead, thereby forming a corresponding number of data entry groups.

Figure 4:
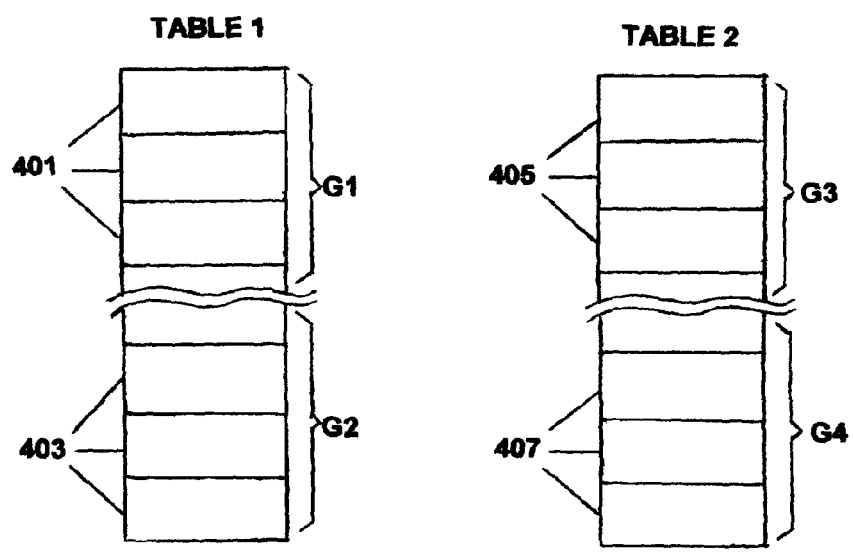
FIG. 4 shows two tables illustrating processing of data in a path searcher of the receiver of FIG. 1 operating in accordance with an embodiment of the invention.

A further example is illustrated in FIG. 4. The further method is a modification of that using four tables described above. In the further method, the four thresholds shown in FIG. 3 are employed to form data groups in two tables. In the further method, the four thresholds shown in FIG. 3 are again used to form four data entry groups G1, G2, G3 and G4. However, a single Table 1 is employed to record: (i) the group G1 of data entries which are for results which are not less than the threshold T1 only; and (ii) the group G2 of data entries which are for results which are not less than the threshold T2 but less than T3 and T4. In addition, a single Table 2 is employed to record the group G3 of data entries which are for results which are not less than: (i) the thresholds T1, T2 and T3 but not T4; and (ii) the group G4 of data entries which are for results which are not less than the threshold T4. The Table 1 and the Table 2 have a total of n data entry positions.

The Table 1 and the Table 2 employed in the further method described above may have an equal number n/2 of data entry positions. Alternatively, the Table 1 and the Table 2 may have unequal numbers of data entry positions wherein the relative numbers are selected by design.

FIG. 4 shows two tables illustrating processing of data using the two Tables 1 and 2 in the further example of a method. Data entry positions which appear in the upper part of the Table 1 are indicated in FIG. 4 by the reference numeral

401. Data entry positions which appear in the bottom part of the Table 1 are indicated in FIG. 4 by the reference numeral 403. Data entry positions which appear in the upper part of the Table 2 are indicated in FIG. 4 by the reference numeral 405. Data entry positions which appear in the bottom part of the Table 2 are indicated in FIG. 4 by the reference numeral 407.

In the further method, the group G1 of data entries may be formed in Table 1 shown in FIG. 4 by filling the data entry positions in Table 1 beginning at the uppermost position 401 and working downward to fill each vacant position in turn. The group of data entries G2 may be formed in Table 1 by filling the data entry positions beginning at the lowest position 403 and working upward to fill each vacant position in turn. The group G3 of data entries may be formed in Table 2 by filling the data entry positions beginning at the uppermost position 405 and working downward to fill each vacant position in turn. The group of data entries G4 may be formed in Table 1 by filling the data entry positions beginning at the lowest position 407 and working upward to fill each vacant position in turn. Thus, in the further method, a data entry for the replica signal showing the result 301 in FIG. 3 is recorded in the group G1 of data entries in the Table 1 shown in FIG. 4. A data entry for the replica signal showing the result 303 in FIG. 3 is recorded in the group G4 of data entries in the Table 2. A data entry for the replica signal showing the result 305 in FIG. 3 is recorded in the group G2 of data entries in the Table 1. A data entry for the replica signal showing the result 307 in FIG. 3 is recorded in the group G3 in the Table 2.

If, eventually, all of the data entry positions in the Table 1 become filled in a given processing frame, the group G1 and the group G2 will meet. This may be at the centre of the Table 1 or above or below the centre. Thus, in filling of the Table 1, some of the data entries of the group G2 may be made in positions 401 in the upper part of the Table 1 or some of the data entries of the group G1 may be made in positions 403 in the lower part of the Table 1, depending on the relative numbers of entries included in the groups G1 and G2.

Similarly, if, eventually, all of the positions in the Table 2 become filled in a given processing frame, the group G3 and the group G4 will meet. This may be at the centre of the Table 2 or above or below the centre. Thus, in filling of the Table 2, some of the data entries of the group G4 may be made in positions 405 in the upper part of the Table 2 or some of the positions 407 in the lower part of Table 2 may be filled by data entries of the group G3, depending on the relative numbers of entries included in the groups G3 and G4.

When the Table 1 incorporating data entries for the group G1 and for the group G2 has become filled, and at least one further result is obtained requiring a data entry in the group G2, then the data entry in the group G2 may be made by replacing a data entry already in the Table 1 in the group G1. Similarly, when Table 2 has become filled and at least one further result is obtained requiring a data entry in the group G4, then the data entry in the group G4 may be made by replacing a data entry already in the Table 2 in the group G3. The replaced entry in the group G3 may itself be saved by moving the entry to the Table 1, e.g. by replacing an entry in the lowest energy group G1. The selection of results for further processing in step 205 is made for each frame using the Tables 1 and 2 by taking the data entries from the Tables 1 and 2 to identify the time positions of the selected replica signals, beginning with the entries for the Table 2, then the entries for the Table 1.

Using combined tables to accommodate multiple groups of data entries in the manner described above with reference to FIG. 4 allows the path searcher 109 to be implemented more easily in hardware form and allows operation of the path searcher 109 to be managed more easily than in the embodiment in which each data entry group is compiled in its own dedicated table, e.g. in four tables using four thresholds.

Where only two thresholds are employed in operation of the step 203, the data entries for the results selected using the two thresholds are inserted into two groups corresponding to the two thresholds. The groups may be incorporated in a combined single table or list or in separate tables or lists for each group.

One or more of the thresholds employed may in use be dynamically adjusted to suit operating conditions. For example, one or more of the thresholds may be set at a variable level at the start of each processing frame of the path searcher 109. (As noted earlier, in this context, a processing frame is the duration of one cycle of operation of the path searcher 109.) For example, at least one of the thresholds for use in a given processing frame may be set at an energy level which relates to one of the correlation energy results for the preceding frame. For example, the thresholds for use in each processing frame may be set at levels which relate to a maximum energy result Emax for the preceding frame. The thresholds may be set at pre-determined energy differences relative to the maximum energy result Emax for the preceding frame. The thresholds may be set at energy levels which differ in pre-determined steps (in energy) from Emax.

For example, where the units of the correlation energy results are −dB and the four thresholds illustrated in FIG. 3 are used, the lowest (smallest) energy threshold T1 may be suitably set at a level which is 12 dB below Emax, the energy threshold T2 may for example be suitably set at a level which is 9 dB below Emax, the energy threshold T3 may for example be suitably set at a level which is 6 dB below Emax, and the highest (greatest energy) threshold T4 may for example be suitably set at a level which is 3 dB below Emax. Where the units of the correlation energy results are −dB and the minimum number of two thresholds are used, the lower (smaller) energy threshold may for example be suitably set at a level which is 10.4 dB below Emax and the higher (greater) energy threshold may for example be set at a level which is set at a level which is 4.7 dB below Emax. These various levels were found to be suitable by design using trial and error.

It is to be noted that, in operation of step 203 of the path searcher 109, the number n, e.g. n=64, is the maximum number of the results that can be selected for use in step 205 in a given processing frame. All results which are selected for data entry in one of the tables referred to above will have a correlation energy which is not less than at least the first (lowest energy) one of the thresholds, e.g. the threshold T1 in FIG. 3. If the number of results that are not less than at least the first (lowest energy) threshold for the frame is less than n then that is satisfactory, since all results having an energy less than (smaller than) the first (lowest energy) threshold are considered as noise. If there are more than n results for the processing frame that are not less than the first (lowest energy) threshold, then when n of the results have been obtained and the related data has been entered in the tables as described earlier, the additional results obtained following the n results may be ignored (unless they can replace a result in a lower energy group as described earlier) since there is no place in the tables for them. That is satisfactory since results which are not less than at least the first (lowest energy) threshold are already available.

Sorting correlation energy results in the order of their energies is a procedure known in the prior art. However, this known 'set ordering' or 'ordering' procedure involves ordering the correlation results for all of the m members of the set A of possible components. In order to carry out such ordering using such a large number m of results, m·log 2m sorting operations are required. In contrast, the example methods embodying the invention can be operated using only m·k operations, where k is the number of thresholds used. Thus, the methods embodying the invention can be operated using a significantly smaller number of processing operations. This allows the processor serving as the path searcher 109 to require less MCPS (Mega Cycles Per Second) in software capacity and a smaller hardware logic size and power consumption. As noted earlier, the processor, which may be a digital signal processor in the form of a semiconductor device (integrated circuit), can beneficially be fabricated using a smaller die size. The processor serving as the path searcher 109 may also carry out functions of one or more of the other processing components shown in FIG. 1 (or other functions of the receiver 100 which are not shown in FIG. 1) as well as that of the memory 112.

In the prior art it is also known to build a table using a single energy level threshold to select correlation energy values for further processing. However, such a selection method is not satisfactory if the threshold is not appropriately set. If the threshold is set too low, too many results will be selected which are noise rather than signal. On the other hand, if the threshold is set too high, the selection method is not satisfactory because there are too few results which are above the threshold. In contrast, operation of step 203 in accordance with the multiple threshold procedure embodying the invention allows the thresholds to be set so that the results may be selected in a simple manner by use of the multiple thresholds without having too many results which are for noise and too few results because one threshold is set too high. The multiple thresholds may be set at suitable energy intervals to cover the range of energy results obtained.

Thus, the multiple threshold selection procedure embodying the invention can give a better performance than the known single threshold selection procedure. The performance may be slightly inferior to that of the known set sorting procedure but is less complex to implement and can give satisfactory results approaching those obtained using the set sorting procedure. The relative performance is illustrated as follows with reference to FIG. 5.

Figure 5:
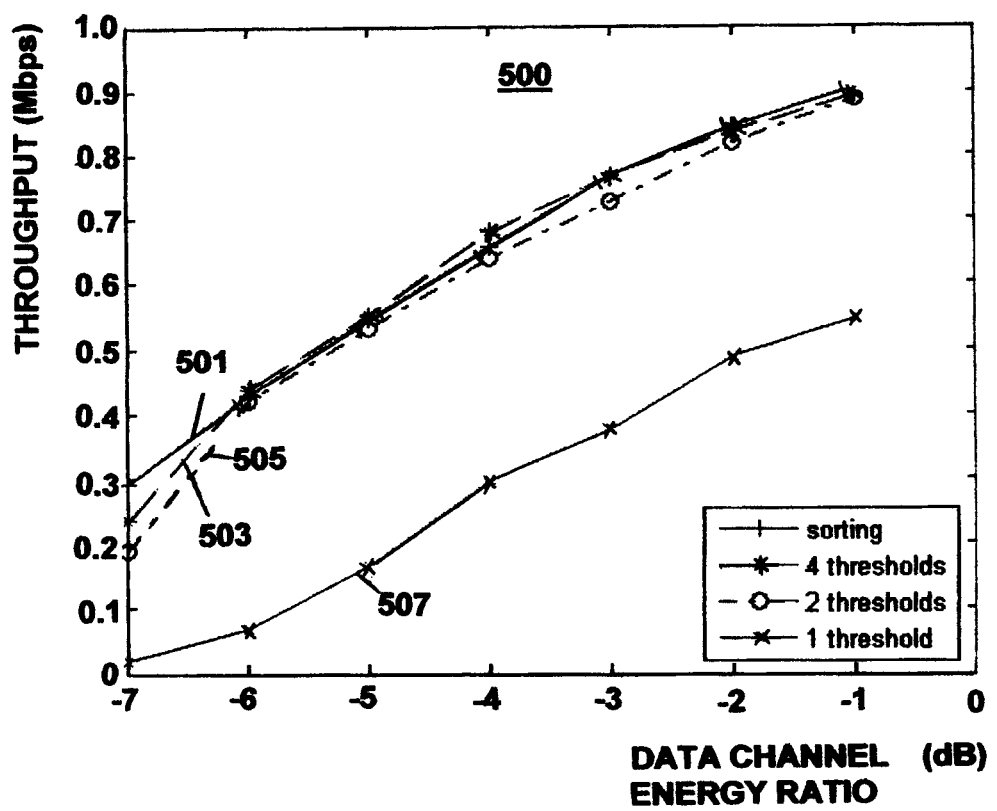
FIG. 5 is a graph of data throughput versus data channel energy ratio, illustrating relative simulated performance of processors embodying the invention compared with processors of the prior art for use as path searcher in the receiver of FIG. 1

FIG. 5 is a graph 500 illustrating the performance of the multiple threshold procedure embodying the invention relative to that of the known path searcher sorting ('sorting') procedure referred to earlier and the known 'one threshold' procedure referred to earlier. The graph 500 shows results for simulation carried out for a WCDMA receiver having the line-up shown in FIG. 1 when processing a P-CPICH signal. The first dwell in the path searcher 109 produces 512 (five hundred and twelve) short correlation results from which no more than the 64 (sixty four) best results are to be selected in the step corresponding to step 203. In the simulation, two examples of the multi-threshold method embodying the invention were used. In a first example using four thresholds, namely the four thresholds T1, T2, T3 and T4, the threshold T1 was set in each processing frame at a level 12 dB below Emax for the preceding frame, the threshold T2 was set in each processing frame at a level 9 dB below Emax for the preceding frame, the threshold T3 was set in each processing frame at a level 6 dB below Emax for the preceding frame and the threshold T4 was set in each processing frame at a level 3 dB below Emax for the preceding frame. In a second example using two thresholds, the lower (smaller energy) threshold was set in each processing frame at a level 10.4 dB below Emax for the preceding frame, and the higher energy threshold was set in each frame at a level 4.7 dB below Emax for the preceding frame.

In the graph 500, data throughput measured in Mbps (Megabits per second) is plotted against data channel energy as a ratio of total cell energy measured in dB. A curve 501 plotted in the graph represents the results obtained using the known path searcher sorting procedure. A curve 503 represents the results obtained using the multiple threshold procedure embodying the invention using four thresholds. A curve 505 represents the results obtained using the multiple threshold procedure embodying the invention using two thresholds. A curve 507 represents the results obtained using the known single threshold procedure. The curve 507 was plotted using for each frame a single threshold 9 dB below Emax for the preceding frame (The figure of 9 dB was the best figure selected from various different figures tried).

For each curve plotted in FIG. 5, the higher the curve for a given ratio of data channel energy the better the performance. In other words, the higher the curve, the greater the amount of data that can be transmitted for the same data channel energy. As can be seen from FIG. 5, each of the multiple threshold procedures represented by curves 503 and 505 gives a significant improvement in performance compared with the single threshold procedure represented by curve 507. Each of the multiple threshold procedures represented by curves 503 and 505 gives a performance close to the known sorting procedure represented by curve 501 but the sorting procedure requires a more complex implementation.

Figure 6:
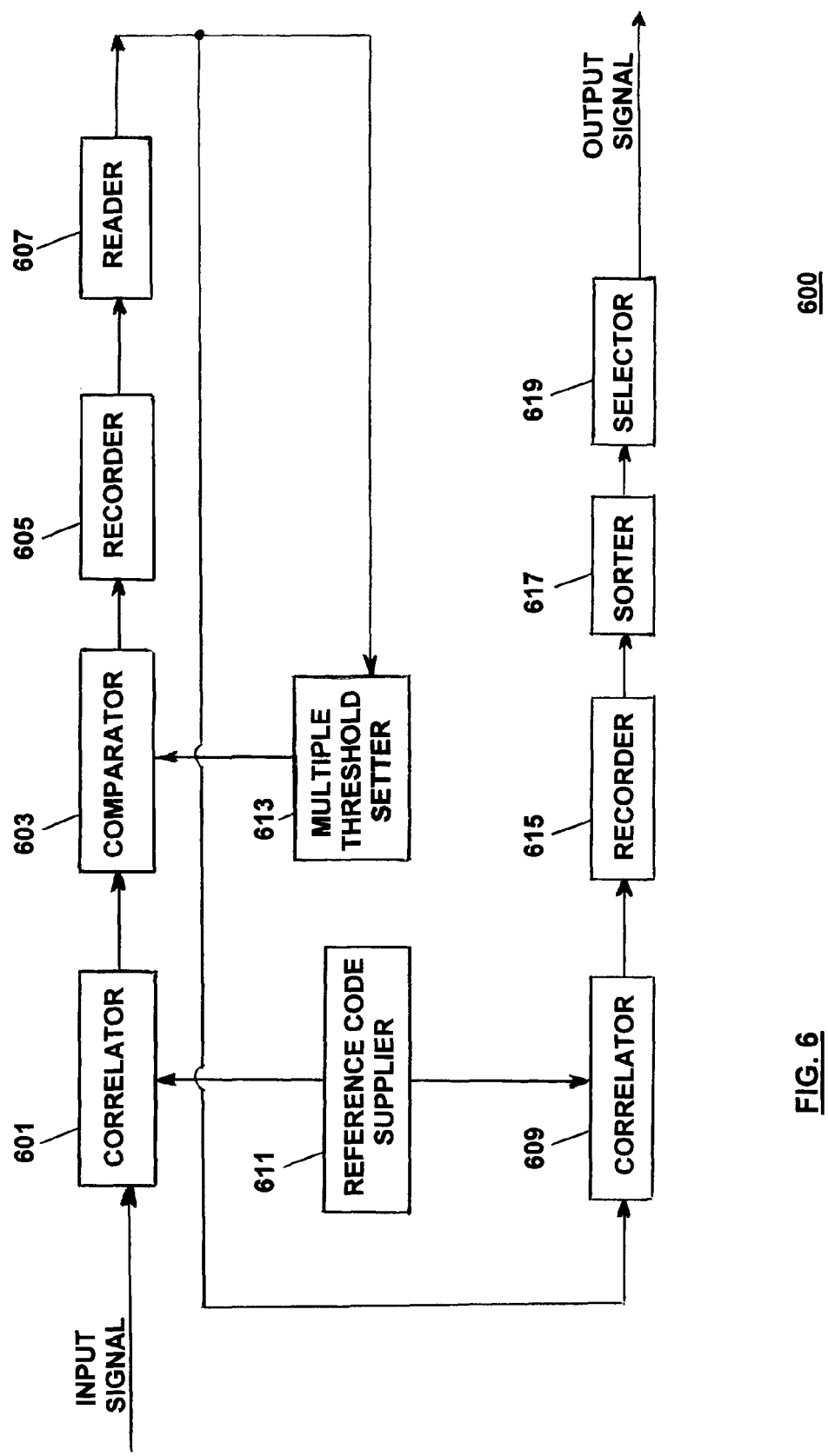
FIG. 6 is a block schematic diagram of an example of arrangement of functional units which may be employed in the path searcher of the receiver of FIG. 1.

FIG. 6 illustrates an arrangement 600 of functional units which is an example of an arrangement which may be employed in the path searcher 109 to carry out the procedure 200 in one of the ways described above, e.g. with reference to FIGS. 3 and 4. The arrangement 600 includes a correlator 601 which receives an input signal to be processed. The correlator 601 carries out the short dwell correlation described earlier at each of the time positions in the set A of time positions using the reference code previously obtained from the cell searcher 107. The reference code is supplied to the correlator 611 by a reference code supplier 611 which may itself have obtained the code from a memory which has stored the code since its receipt from the cell searcher 107, for example the memory 112. The correlator 601 produces for each of the A time positions a correlation energy result. A comparator 603 compares each of the A correlation energy results with each of the required multiple thresholds provided by a multiple threshold setter 613. A recorder 605 records a data entry for each of the correlation energy results which are not less than the respective thresholds. Each data entry includes the time position giving the particular result. The recorder 605 records the data in groups according to the different thresholds that the various results equal or exceed as described earlier. In some cases, the recorder 605 may replace an entry in a lower energy group with one in a higher energy group as described earlier.

At the end of a processing frame processed by the arrangement 600 when correlations have been carried out by the correlator 601 for all of the A time positions and data for the corresponding results have been recorded, a reader 607 reads out the recorded data relating to the n or less results which have been recorded by the recorder 605. Thus, the comparator 603, the recorder 605 and the reader 607 may be considered to comprise a selector which selects the sub-set B of time positions giving the best correlation energy results in the first dwell correlation procedure operated by the correlator 601.

An output signal produced by the reader 607 is delivered to a further correlator 609 to begin a second dwell correlation procedure. The output signal indicates the sub-set B of the corresponding selected time positions giving the data entries recorded by the recorder 605. The output signal produced by the reader 607 is also delivered to the multiple threshold setter 613 which uses the data included in the signal produced in each processing frame in one of the ways described earlier to set the multiple thresholds for use in the next processing frame of the comparator 603.

The correlator 609 carries out a longer dwell correlation for each of the sub-set B of time positions as described earlier using the reference code supplied by the reference code supplier 611. A recorder 615 records each of the correlation energy results produced by the correlator 609. A sorter 617 sorts the correlation energy results recorded by the recorder 617 in terms of their correlation energies. As will be apparent to those skilled in the art, the operations of the recorder 615 and the sorter 617 may be carried out as separate operations or combined into a single operation. A selector 619 selects from the results sorted by the sorter 617 the best p results and produces an output signal accordingly which indicates a sub-set C of the time positions having the best p results selected by the selector 619. The output signal produced by the selector 619 is delivered for further processing in a known manner to the channel estimator 111 (FIG. 1) via the equalizer 113 (FIG. 1).

As will be apparent to those skilled in the art, the operations of the various units shown in FIG. 6 may be carried out as separate operations although, in some cases, the operations of some units shown, such as the recorder 615 and the sorter 617, may be combined into a single operation.

It will be understood that the improved path searcher and method of operation therefor, as described above, aims to provide at least one or more of the following: a performance which approaches that of a path searcher using the known sorting procedure but which may be implemented and operated in a simpler manner; and a performance which is better than that of a path searcher using the known one threshold procedure.

Also, the path searcher embodying the invention, and optionally one or more other components of the receiver in which the path searcher is incorporated, e.g. the cell searcher 107, may be applied by a semiconductor manufacturer to any integrated circuit architecture suitable for implementing such a path searcher. It is further envisaged that, for example, a semiconductor manufacturer may employ the path searcher in a design of a stand-alone device, or application-specific integrated circuit (ASIC) and/or any other sub-system element.

It will be appreciated that any suitable distribution of functionality between different functional units or controllers or logic elements or memory elements, may be used without detracting from the embodiments herein described. Hence, references to specific functional devices or elements are only to be seen as references to suitable means for providing the described functionality, rather than indicative of a strict logical or physical structure or organization. By way of example, the cell searcher 107 coupled to the path searcher 109 have been illustrated and described as separate functional elements of the receiver 100. However, the cell searcher 107 coupled to the path searcher 109 may be provided within a combined functional element.

Aspects of the invention may be implemented in any suitable form including hardware, software, firmware or any combination of these. The elements and components of an embodiment of the invention may be physically, functionally and logically implemented in any suitable way. Indeed, the functionality may be implemented in a single unit or IC, in a plurality of units or ICs or as part of other functional units.

Furthermore, it is contemplated that the path searcher 109, e.g. in the form of the arrangement 600, may be a programmable device which is operated by application of a suitable computer program. Thus, there may be a computer-readable storage element in one of the forms well known to those skilled in the art which has computer-readable code stored thereon for programming signal processing logic to perform a method of processing a signal in a path searching procedure in a spread spectrum receiver, the method being to operate the path searcher 109 in one of the ways described earlier.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Furthermore, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second' etc. do not preclude a plurality.

The invention claimed is:

1. A path searcher for use in of a spread spectrum receiver, comprising:
a correlator to correlate a received signal in different time positions with a reference code to select for further processing time positions of the signals showing the strongest correlations, wherein the correlator is operable to obtain m correlation energy results, one for each time position in a set of m possible time positions;
a comparator to compare the m correlation energy results with each of a plurality of energy thresholds to separate the m correlation energy results which are not less than the respective energy thresholds into groups;
a selector to select for further processing a sub-set of up to n signals defined by the m correlation energy results, including a recorder to record data to indicate time positions for the separated correlation energy results in the groups, to indicate a first group that has an energy ordering according to the highest of the thresholds, to indicate a second group that has results that are not less than at least two of the thresholds, and to indicate a third group, that has results which are not less than at least one of the thresholds; and
a reader to read results recorded in each of the first, second and third groups in turn in the energy ordering of the groups beginning with the group of highest energy until a predetermined number of results have been obtained or, if there are less than the predetermined number of results recorded in the groups, until all results in the groups have been obtained.

2. The path searcher according to claim 1 wherein the recorder is operable to record the results in a number of the groups greater than two.

3. The path searcher according to claim 1 wherein the recorder is operable to record data for the results for each of the different groups in a table dedicated to the group, the number of tables being equal to the number of groups.

4. The path searcher according to claim 1 wherein the recorder is operable to record data results for each of a plurality of the groups in a combined table, the number of tables being less than the number of groups.

5. The path searcher according to claim 4 wherein the recorder is operable to record data results for a first group in the combined table by filling positions in turn from one end of the table and to record results for a second group in the combined table by filling positions in turn from the other end of the table.

6. The path searcher according to claim 5 wherein the recorder is operable when the table is full to replace a data entry for at least one result for the first group with a data entry for at least one result for the second group.

7. The path searcher according to claim 1 wherein the recorder is operable to record in a first table data for correlation energy results not less than a first energy threshold and less than a third threshold and to record in a second table data for correlation energy results not less than a third threshold.

8. The path searcher according to claim 7 wherein the recorder is operable to record in the first table also data for correlation energy results not less than a second threshold greater than the first threshold and less than the third threshold.

9. The path searcher according to claim 8 wherein the recorder is operable to record in the second table also data for correlation energy results not less than a fourth threshold greater than the third threshold.

10. The path searcher according to claim 1 wherein the recorder is operable to record for each data entry for a given correlation energy result the energy result as well as a time position of the signal having the correlation energy result.

11. The path searcher according to claim 1 further comprising a threshold setter for adjusting one or more of the energy thresholds dynamically to suit operational conditions.

12. The path searcher according to claim 11 wherein the threshold setter is operable to adjust one or more of the thresholds at the start of each processing frame of operation of the path searcher.

13. The path searcher according to claim 12 wherein the threshold setter is operable to set one or more of the thresholds at the start of each processing frame of operation of the path searcher to an energy level which relates to one of the correlation energy results for the preceding frame.

14. The path searcher according to claim 13 wherein the threshold setter is operable to set one or more of the thresholds at the start of each processing frame of the path searcher at an energy level which relates to the maximum correlation energy result Emax for the preceding frame.

15. The path searcher according to claim 14 wherein the threshold setter is operable to set one or more of the thresholds at the start of each processing frame of the path searcher at a pre-determined energy difference relative to the maximum correlation energy result Emax for the preceding frame.

16. The path searcher according to claim 1 wherein the correlator is operable to correlate the signal at each of the time positions in the set of time positions with a reference scrambling code found in an earlier operation by a cell searcher.

17. The path searcher according to claim 1 further comprising a first correlator to carry out a first correlation procedure and a second correlator to carry out a second correlation procedure in each processing frame of the path searcher, wherein the first correlator is operable to correlate a received signal at each position of a set of time positions with a reference code, and the second correlator is operable to correlate a received signal at each position of a sub-set of time positions selected from the set of time positions, the correlation by the second correlator being for a longer duration than the correlation by the first correlator.

18. A spread spectrum receiver including the path searcher according to claim 1.

19. A method of processing a signal in a path searching procedure in a spread spectrum receiver comprising:
 correlating by a correlator signals received from different paths at different positions in time with a reference code;
 selecting for further processing time positions of n of the signals showing the strongest correlations, including obtaining m correlation energy results, one for each time position in a set of m possible time positions of the signals, comparing each of the m correlation energy results with each of a plurality of energy thresholds and separating correlation energy results which are not less than the respective energy thresholds into groups;
 recording data indicating time positions for the separated correlation energy results in groups, indicating a first group that has which groups have an energy ordering according to the highest of the thresholds, indicating a first group that is not less than at least two thresholds, and indicating a third group, that is not less than at least one of the thresholds; and
 reading results recorded in each of the first, second and third groups in turn in the energy ordering of the groups beginning with the group of highest energy until a predetermined number of results have been obtained or, if there are less than the predetermined number of results recorded in the groups, until all results in the groups have been obtained.

20. A non-transitory computer-readable storage element having computer-readable code stored thereon for programming signal processing logic to perform a method of processing a signal in a path searching procedure in a spread spectrum receiver, the method comprising:
 correlating signals received from different paths at different positions in time with a reference code selecting for further processing time positions of n of the signals showing the strongest correlations, wherein the selection is carried out by obtaining m correlation energy results, one for each time position in a set of m possible time positions of the signals;
 comparing each of the m correlation energy results with each of a plurality of energy thresholds and separating correlation energy results which are not less than the respective energy thresholds into groups;
 recording data indicating time positions for the separated correlation energy results in groups, indicating a first group that has an energy ordering according to the highest of the thresholds, indicating a second that is not less than at least two of the thresholds, and a third group that is not less than at least one of the thresholds; and
 reading results recorded in each of the first, second and third groups in turn in the energy ordering of the groups beginning with the group of highest energy until a predetermined number of results have been obtained or, if there are less than the predetermined number of results recorded in the groups, until all results in the groups have been obtained.

* * * * *